Jan. 11, 1927.  1,614,204
F. LJUNGSTROM
REVERSING DEVICE FOR TOOTHED GEARING
Filed Oct. 4, 1923  2 Sheets-Sheet 1
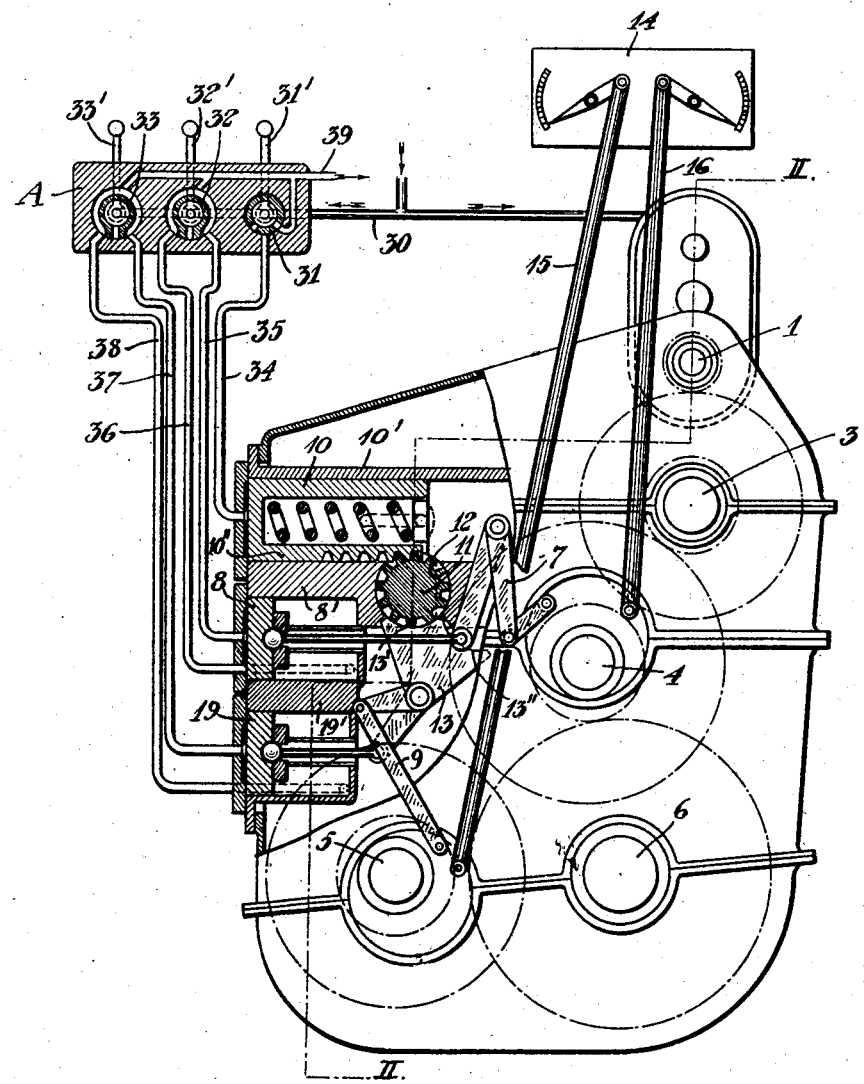
Inventor
F. Ljungstrom
By Marks & Clerk
Attys.

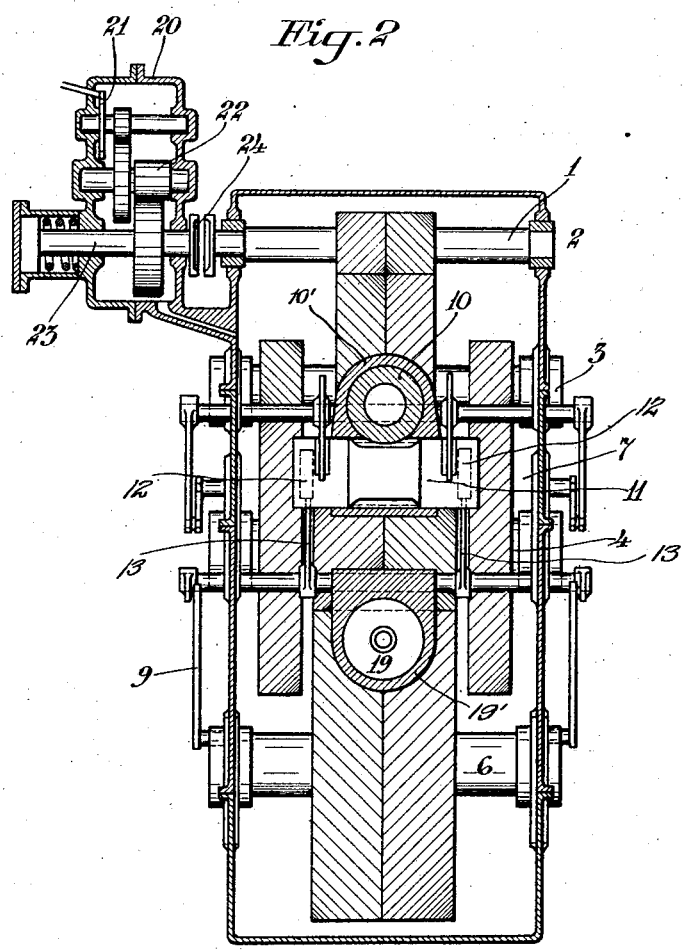

Patented Jan. 11, 1927.

1,614,204

UNITED STATES PATENT OFFICE.

FREDRIK LJUNGSTROM, OF LIDINGO-BREVIK, SWEDEN, ASSIGNOR TO AKTIEBOLAGET LJUNGSTRÖMS ANGTURBIN, OF LIDINGO-BREVIK, SWEDEN.

REVERSING DEVICE FOR TOOTHED GEARING.

Application filed October 4, 1923, Serial No. 666,606, and in Sweden October 3, 1922.

In locomotives provided with mechanical power transmitting means between the driving motor and the driving wheels, it is known to carry out the mechanical power transmission by means of toothed wheels and parts belonging thereto and to effect reversing by coupling in and out two or more toothed wheels within the gearing, by radially adjusting the several toothed wheels, an additional toothed wheel, preferably standing still during forward running, being coupled in between two other toothed wheels, which are brought out by engagement with each other. In moving the gear wheels towards each other in radial direction, it is difficult to obtain, immediately, a mesh between the gear wheels, because of the liability that the crowns of the teeth meet with each other instead of the crowns of the teeth of one wheel immediately entering the tooth spaces of the other wheel. Several proposals have been made for causing the gear wheels to assume such positions that the teeth properly mesh. Thus, for instance, it has been proposed to turn (by means of levers or the like) one or both of the wheels to be coupled together to such position that a proper mesh is made. However, with such means, it is difficult to bring about the meshing, especially if the gear wheels are spiral cut and two opposed crowns of the teeth are already contacting with each other.

The present invention relates to an arrangement in toothed gearings of the above kind by which a more rapid and reliable mesh is obtained, at the reversing moment. The invention consists substantially in a motor being provided in addition to the driving motor, said additional motor turning at the reversing moment one or more wheels of the gearing. According to the invention, the said reversing motor consists of an oil-driven turbine solely adapted for said controlling operation and being connected with one of the shafts of the toothed gearing by means of a disengageable friction, tooth or other clutch.

In the accompanying drawings a toothed gearing having a known reversing device and arranged according to the present invention is schematically shown.

In said drawings:—

Fig. 1 is a side view of the toothed gearing, and details of piping and index devices which are not shown in Fig. 2 which is a section of Fig. 1 along the broken line II—II. Fig. 3 is a perspective view of a detail of a locking device.

Referring to the drawings, 1 designates the speedy running shaft of the gearing, which is for instance at 2 connected to a driving motor, preferably a steam turbine, located at the side of the toothed gearing. By means of several toothed wheels the shafts 3, 4, 5 and 6 are driven in accordance with earlier proposals in similar gearings, the shaft 5 with its appertaining toothed wheels being thrown in through an eccentric movement only in cases of a reversed running being desired. The several gear wheels of the said shaft 5 are then brought into engagement with the corresponding gear wheels of the shaft 4 and the shaft 6 after one pair of gear wheels of the shaft 4 are brought out of engagement with the gear wheel of the shaft 6, by eccentrical adjustment of the shaft 4.

In order to perform within the gearing, a reversed movement of the last and slowest running shaft 6, the engagements of the several wheels of the gearing are changed by radial adjustment of two shafts with appertaining gear wheels. The said displacements of the shafts may be performed by hand, for instance by adjustment of a handle or the like, or in any other way, for instance by means of oil pressure, said latter controlling means being illustrated in Fig. 1. Said figure illustrates the manner in which the eccentric mounting of the shaft 4 is connected to the piston 8 by means of an arm system 7. By introducing oil on one or the other side of the piston 8 in the corresponding cylinder 8', the shaft 4 may be raised and lowered and so adjusted as to obtain the desired engagement of the teeth. In a similar manner the shaft 5 may be turned to such a position as to obtain the desired engagement of the teeth, by means of the arm system 9 by introducing oil at one or the other side of the piston 19 in the corresponding cylinder 19'.

10 designates a spring-controlled piston movable in a cylinder 10' and provided with a rack 10" which engages a cylinder 11 having teeth on part of its length and provided with notches 12. In the position shown in the drawing, the round part of the cylinder 11 extends into a corresponding recess 13' in a sector-formed member 13 connected to the arm system 9. In the position shown, the arm system 9 and the reversing device are locked. If the cylinder 11 be turned by the rack 10″ of the piston 10, until the notches 12 come face to face with the member 13, the reversing may be performed, because the member 13 is then able to pass by the cylinder 11. The reversing device may also be locked in the position corresponding to a movement in the opposite direction and in this case the cylinder 11 is turned so that its round part extends into a second recess 13″ in the disk 13.

A designates an oil distributing device supplying oil to the several cylinders 10′, 8′ and 19′, said device comprising an oil supply pipe 30 delivering oil to three valves 31, 32 and 33 which control the oil supply to the cylinders 10′, 8′ and 19′ respectively. Each valve is controlled by a handle 31′, 32′ and 33′ respectively, and according to the position of each of said handles the oil will flow to and from the cylinder 10′ through the pipe 34, to the cylinder 8′ through the pipe 35 and from said cylinder through the pipe 36, to the cylinder 19′ through the pipe 37 and from said cylinder through the pipe 38. From the valves 31, 32 and 33 the oil flows through the pipe 39.

In the position of the gear wheels shown in the drawings, a forward running of the shaft 6 is obtained, the gear wheels of the shaft 5 being out of engagement with all other wheels and, thus, standing still. If reverse running is desired, oil is first introduced in the cylinder 10′ by adjusting the handle 31′ accordingly. The oil pressure moves the piston 10 forward, whereby the cylinder 11 is rotated into such a position that the member 13 will be able to pass by the cylinder 11. Herewith the locking device is released. Oil is then introduced into the cylinder 8′ through the pipe 35 by adjusting the valve 32 by means of the handle 32′. The piston 8 is moved forward by the oil pressure, said movement being transmitted by the arm system 7 to the eccentric mounting of the shaft 4, bringing the pinions of said shaft out of engagement with the gear wheels of the shaft 6. By turning the handle 33′, oil is then introduced into the cylinder 19′ moving the piston 19 forward, which movement is transmitted by the arm system 9 to the eccentric mounting of the shaft 5, bringing the gear wheels of said shaft 5 into engagement with the gear wheels of the shaft 4 and those of the shaft 6, a reversed running being thereby obtained.

On shifting the gearing to forward running, at first the piston 19 is operated by oil being introduced on its rear side through the pipe 38 by adjusting the valve 33 accordingly by means of the handle 33′, the oil on the front side of the piston 19 flowing out through pipe 37, valve 33 and pipe 39. Hereby the gear wheels of the shaft 5 are brought out of engagement with the gear wheels of the shafts 4 and 6. Then oil is introduced on the rear side of the piston 8 through the pipe 35 by adjusting the valve 32 accordingly by means of the handle 32′, the oil on the front side of the piston 8 flowing out through the pipe 35, valve 32 and pipe 39. Hereby the gear wheels of the shaft 5 are brought into engagement with the gear wheels of the shaft 6, forward running being thereby obtained. Then the valve 31 is shifted by means of the handle 31′ so as to bring about communication between the pipe 34 and the outlet pipe 39, causing the piston to be moved backwards actuated by its spring, whereby the cylinder 11 is rotated so that its round part engages the recess 13′ of the disk 13, thus locking the reversing device.

According to the invention, one of the gear wheel shafts with appertaining gear wheels, in the present case the fastest running shaft 1, is turned by an auxiliary motor 20. This is preferably an oil motor, for instance an oil-driven Pelton-wheel 21, from which the movement is transmitted through gearings 22 to a shaft 23, which may, by means of a toothed coupling 24, be coupled to the shaft 1. The reversing movements are to be performed only when the turbine is stopped and consequently no power is transmitted to the gearing.

As the transmission ratio between the motor 20 and the shaft 23 and the shaft 1, respectively, is very great, the shaft 1 with its appertaining pinion will, thus, be turned slowly carrying with it the shaft 3 with appertaining gear wheels, whereas the gear wheels of the shaft 4 are stationary. Thus, by turning the shaft 3 the teeth of the gear wheels of said shaft will pass by the teeth and the tooth spaces of the wheels of the shaft 4, so that a reliable mesh between said wheels may be obtained. As the motor 20 drives the shaft 1 constantly, the wheels of the shaft 4 also begin to turn after the coupling is performed, the gear wheel of the shaft 5 being thereby in a similar manner brought into engagement with the gear wheels of the shaft 4. The condition will be the same, when the gear wheels of the shafts 5 and 6 are to be brought into engagement with each other, and after the said coupling together the reversing operation is completed and the auxiliary motor is stopped. If the mounting of the shaft 4 be such that the gear wheels of said shaft are always in engagement with the gear wheel of the shaft 3, said shaft commences to turn simultaneously with the other wheels, the shaft 6 being thereby thrown into gear, or, if reversed, running is to be performed, both the shafts 5 and 6 are thrown into gear.

The Pelton-wheel is preferably driven by oil from the same pressure supply from which oil is taken to the previously known reversing device. By this the advantage is gained that in case of a tooth sliding into a tooth space, the speed of the reversing movement is increased, more oil being thereby necessary in the cylinder in question, which entails a drop of pressure in the pipings and the pressure supply, respectively. The said drop of pressure decreases the speed of the Pelton-wheel, which is advantageous, because of the starting of the coupled in wheel being thereby facilitated.

If the auxiliary motor 20 consists of a Pelton-wheel 21, oil may be introduced into the said motor as soon as said motor has (by hand or by means of oil pressure) been coupled together with the gearing without causing the motor to immediately drive the gearing. The shaft 6 forms in the embodiment shown, the driving wheel shaft of a locomotive or is connected to the driving wheels, and on account of this, the small auxiliary motor 20 (which cannot alone drive the locomotive), cannot be started until any of the wheels secured to the shafts 4 and 5 is released from the gear wheel of the shaft 6. When oil is introduced into the Pelton-wheel 21, the exhaust oil runs away from the said wheel, preferably to the other parts of the gear casing, where it may preferably be used as lubricating oil and collected at the bottom of the gear casing.

By turning the handles 31', 32' and 33', the controlling movement may be performed in known manner in the right order, the advance of the controlling movement being read on the dial 14. Supposing it not to be suitable, when coupling together the gear wheels of the shafts 5 and 4, to stop for instance the shaft 5 and cause the coupling together to be performed by having the crowns of the teeth sliding on each other, until the engagement takes place, the reversal may be performed by such an adjustment of the handle 33' that the gear wheels are moved to and fro relatively, until the engagement takes place. When the gear wheels are moved towards each other and a tooth does not immediately enter into a tooth space, which may be immediately read on the dial, the handle 33' is moved to such a position that the gear wheels are moved for a moment from each other in order to then be moved (by reversing the handle 33') towards each other, until the mesh may be performed. On account of the profile of the teeth, there are greater chances that the teeth will slide into each other than that the teeth will be obstructed, and the said possibility will be increased by the gear wheels being slowly turned with respect to each other.

The above described controlling device, which forms but one embodiment of the invention, may be combined with hitherto known safety devices for preventing damage to the teeth or the like, for instance such safety devices, which prevent a controlling movement, when the steam supply of the driving motor of the locomotive is open and so on. The invention is not dependent on the form of toothed gearing or of the several controlling devices or on the relative position of said parts, and, therefore, other embodiments than the above described may be used without departing from the principle of the invention.

What I claim as new and desire to secure by Letters-Patent is:—

1. In locomotives and similar vehicles, a driving motor, driving wheels, a toothed gearing transmitting the power from said driving motor to said driving wheels, means in said toothed gearing for reversing the direction of movement by radially adjusting at least one of the wheels of the gearing, and an additional rotatable motor for turning one of the gear wheels to be brought into mesh with each other.

2. In locomotives and similar vehicles, a driving motor, driving wheels, a toothed gearing transmitting the power from said driving motor onto said driving wheels, means in said toothed gearing for reversing the direction of movement by radially adjusting at least one of the wheels of the gearing, an additional rotatable motor for turning one of the gear wheels to be brought into mesh with each other and a disengageable coupling connecting said additional motor with that shaft of the gearing to which the driving motor is connected.

3. In locomotives and similar vehicles, a driving motor, driving wheels, a toothed gearing transmitting the power from said driving motor onto said driving wheels, means in said toothed gearing for reversing the direction of movement by radially adjusting at least one of the wheels of the gearing, an additional rotatable motor for turning one of the gear wheels to be brought into mesh with each other, and another toothed gearing transmitting the power from said additional motor onto the shaft of said gear wheel to be turned.

4. In locomotives and similar vehicles, a driving motor, driving wheels, a toothed gearing transmitting the power from said driving motor onto said driving wheels, means in said toothed gearing for reversing the direction of movement by radially adjusting at least one of the wheels of the gearing, oil controlled means for controlling said reversing means, an additional oil actuated rotatable motor for turning one of the gear wheels to be brought into mesh with each other, and means for supplying oil to said additional motor from the same oil source from which the oil controlled means are fed.

5. In locomotives and similar vehicles, a driving motor, driving wheels, a toothed gearing transmitting the power from said driving motor to said driving wheels, means in said toothed gearing for reversing the direction of movement by radially adjusting at least one of the wheels of the gearing, and an additional motor, adapted, in reversing, to continuously turn one of the gear wheels to be brought into mesh with each other.

In testimony whereof I affix my signature.

FREDRIK LJUNGSTROM.